（12) United States Patent
Webber et al.

(10) Patent No.: US 6,820,186 B2
(45) Date of Patent: Nov. 16, 2004

(54) SYSTEM AND METHOD FOR BUILDING PACKETS

(75) Inventors: Thomas P. Webber, Petersham, MA (US); Hugh Kurth, Lexington, MA (US); Robert Dickson, Harvard, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 381 days.

(21) Appl. No.: 09/817,509

(22) Filed: Mar. 26, 2001

(65) Prior Publication Data

US 2002/0138703 A1 Sep. 26, 2002

(51) Int. Cl.⁷ ............................................. G06F 12/00
(52) U.S. Cl. .................... 711/219; 711/121; 708/209; 708/700; 365/189.12; 365/230.08
(58) Field of Search ........................ 365/189.12, 230.08, 365/240; 710/52, 65, 310; 711/121, 170, 201, 210, 217, 219; 708/209, 233, 700

(56) References Cited

U.S. PATENT DOCUMENTS

| | | | | |
|---|---|---|---|---|
| 4,507,731 A | * | 3/1985 | Morrison | ..................... 711/201 |
| 5,392,406 A | | 2/1995 | Peterson et al. | |
| 5,774,697 A | * | 6/1998 | Hall | ............................ 711/141 |
| 6,185,629 B1 | * | 2/2001 | Simpson et al. | ............... 710/10 |
| 6,330,631 B1 | * | 12/2001 | Crosland | ..................... 710/306 |
| 6,370,558 B1 | * | 4/2002 | Guttag et al. | ................ 708/603 |

FOREIGN PATENT DOCUMENTS

EP       1026597 A2    8/2000    ........... B06F/13/40

OTHER PUBLICATIONS

DeBaets et al. "High Performance PA–RISC Snakes Motherboard I/O/" IEEE, p. 433–440, 1993.
Ghosh et a. "Communication Across Fault–Containment Firewalls on the SGI Origin." p. 277–287, 1998.

* cited by examiner

*Primary Examiner*—Donald Sparks
*Assistant Examiner*—Christian P. Chace

(57) ABSTRACT

Memory requests and responses thereto include a tag that has a shift value indicating the misalignment between the first byte of required packet data and the first byte of a line of data in memory. A packet buffer controller receiving data with an associated tag uses the shift value to shift the received line of data accordingly. The first line of data for the packet data payload is shifted accordingly and written into the packet buffer. Subsequent lines of data require masking the previous line of data except for the last N bytes where N equals the shift value. The shifted line of data is written over the previous line so that the lower order bytes of the shifted received line of data are written. Then the shifted line of data is written into the next line of the packet buffer.

22 Claims, 3 Drawing Sheets

SYSTEM AND METHOD FOR BUILDING PACKETS

BACKGROUND OF THE INVENTION

Many system busses are cache line-oriented and do not support memory requests beginning at arbitrary byte locations. Each memory request fetches an entire cache line by addressing the first byte of the line. Packets transmitted on a network, however, include a payload of data which can begin at any arbitrary byte address. Thus, if the packet payload is to begin with a byte of data in the middle of a cache line, extra complexity is involved in building a packet. When data is returned from memory as a line, the network adapter needs to be instructed to copy only the desired data into a temporary buffer which we call herein a packet buffer. A packet buffer is organized with lines of data beginning at the first byte of the packet payload which is not necessarily the first byte of a cache line. When the logic unit that makes the memory request is different from the logic unit that controls the packet buffer, it is typically necessary to first communicate an indication of the difference between the first byte of the packet payload and the first byte of a cache line. Thereafter, memory requests can be made and the packet buffer can be properly loaded.

SUMMARY OF THE INVENTION

Lines of data are stored in memory. When building a packet payload, a memory access system determines a shift value that corresponds to any misalignment between the first byte in a line of data in memory and the first byte in the data desired for the packet payload. In accordance with an embodiment of the invention, the shift value is incorporated into a tag which is part of a read request for data from memory. A packet buffer control system receives a line of data from memory responsive to the read request. The response from memory also conveniently includes the tag with the shift value. The packet buffer controller shifts the received line of data for storage in a packet buffer in accordance with the shift value.

In accordance with an embodiment of a method of loading a first line of data into a packet buffer, the first line of data is received along with a tag indicating a shift value (N). At least those bytes of data following the first N bytes of data are written into the packet buffer, where N equals the shift value. A mask is set up to prevent overwriting those bytes of data that followed the first N bytes in the line of data.

In accordance with an embodiment of a method for loading a line of data into a packet buffer, preferably a line of data is received from memory along with a tag indicating a shift value. The line of data is shifted in accordance with the shift value in the tag and the shifted line of data is written into the packet buffer. Writing is preferably performed by writing bytes of the shifted line of data that are in unmasked positions of the packet buffer while bytes of the shifted line of data in masked positions of the packet buffer do not make changes to the masked positions of the packet buffer. The shifted line of data is then written into the packet buffer for a second time. A mask is set up for bytes in the packet buffer across the width of the buffer except for the last N bytes where N equals the shift value.

In accordance with embodiments of the present invention, a tag including a shift value is included in a memory request and is passed along to a packet buffer controller in response to the request. It is therefore unnecessary to coordinate a separate communication between the memory request unit and the packet buffer controller to indicate the shift value. The tag may further include a unique identifier so that responses can be put in proper sequence at the packet buffer controller regardless of the order in which the responses are received.

Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
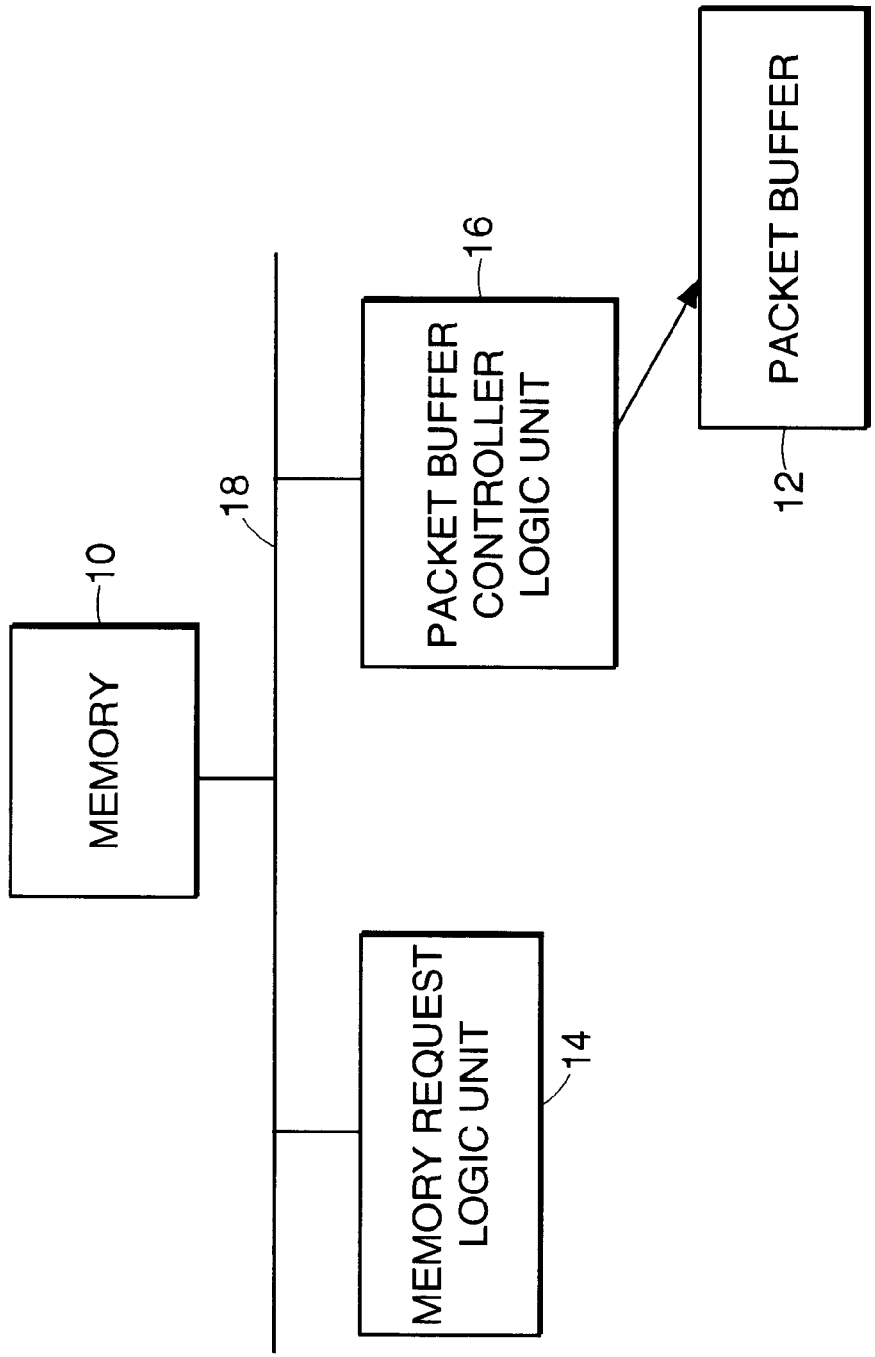
FIG. 1 is a schematic block diagram of a system for building packets of an embodiment of the invention.

Embodiments of the present invention are typically for use in a system in which data is stored in lines in a memory 10 and data read from the memory is used to fill a packet buffer 12 to form a packet payload. Memory is accessed by a system component referred to herein as the memory request logic unit 14. The memory request logic unit is that portion of a system that sends read requests to the memory 10 for obtaining data to fill a packet payload. When a memory request logic unit 14 receives instructions to build a packet payload, it is given a starting address in memory and a length for the packet payload data. In a system that permits a misalignment between the data for use in the packet payload and the lines of data as stored in memory, the memory request logic unit 14 must determine the shift value. The shift value is the number of bytes from the start of a line in memory to the start of the data for use in the packet payload. Memory can be arranged such that the last three bits in the memory address for each line is 000. This is particularly useful in a memory arranged with lines of eight bytes. The shift value can be easily obtained by merely extracting the last three bits from the starting address. Another more complicated way of obtaining the shift value would be to use subtraction between a known starting address for a line of data and the starting address for the packet payload data.

FIG. 4a illustrates a memory 400 arranged where the last three bits 410 in the memory address 412 for the beginning of each line is 000. Line X occupies addresses (a)000 to (a)111 and line X+1 begins at line (a+1)000. In this case, the starting address of data 420 to be included in a packet is (a)011. A shift value 430 associated with the data 420 is obtained by taking the last three bits of the starting address, 011 in this case. FIG. 4b illustrates an alternative method 450 for obtaining the shift value 430. In step 460, data starting address 436 is read. In step 470, the starting address 434 of line X is read. In step 480, the line starting address 434 is subtracted from the data starting address 436 to generate the shift value 430.

In accordance with an embodiment of the invention, FIG. 5 illustrates a read request 500 formed by the memory request logic unit that includes a tag 510. The tag is a field in the request that contains data that is understandable by at least the memory request logic unit 14 and a corresponding packet buffer controller logic unit 16 used to fill the packet buffer. It is not necessary for any other components using the memory bus 18 to have a comprehension of the bits within the tag field. Indeed, other units of the memory bus may use a similarly located tag field for different purposes. It is only necessary for a memory request logic unit 14 and its associated packet buffer controller 16 to agree ahead of time as to the meaning of the bits in the tag field. In this manner, the tag field can be used for other purposes by other logic blocks in the system. In accordance with one embodiment of the invention, a tag is application specific and only has meaning to the logic block originating it and the destination logic block.

Another useful piece of information to include in the tag of a read request is a unique identifier for the read request. Typically a read request asks for a single line of data from memory. A packet payload often includes more data than is included in the single line of data from memory. Therefore, several read requests are used to fill a packet payload. A unique identifier in the tag of each of these read requests helps provide the appropriate order for the retrieved data. A simple method for assigning unique identifiers is to begin with 0001 and increment the field for each subsequent request. By including the tag in the response, the component receiving the data from memory will be able to order the data from memory based on the unique identifiers rather than upon the order in which data is received.

The packet data payload is built in a packet buffer 12. The packet buffer 12 may be a series of registers each of a width for holding a line of data. A packet buffer controller 16 receives a line of data from memory along with its tag. The packet buffer controller logic unit 16 uses the shift value in the tag to set the amount of bytes for shifting the received line of data. Shifting may be accomplished in a wrap-around shift register in the packet buffer controller logic unit 16. Shifting accomplishes putting the first byte of the packet data line at the beginning of the register for writing into the packet buffer 12.

Figure 2:
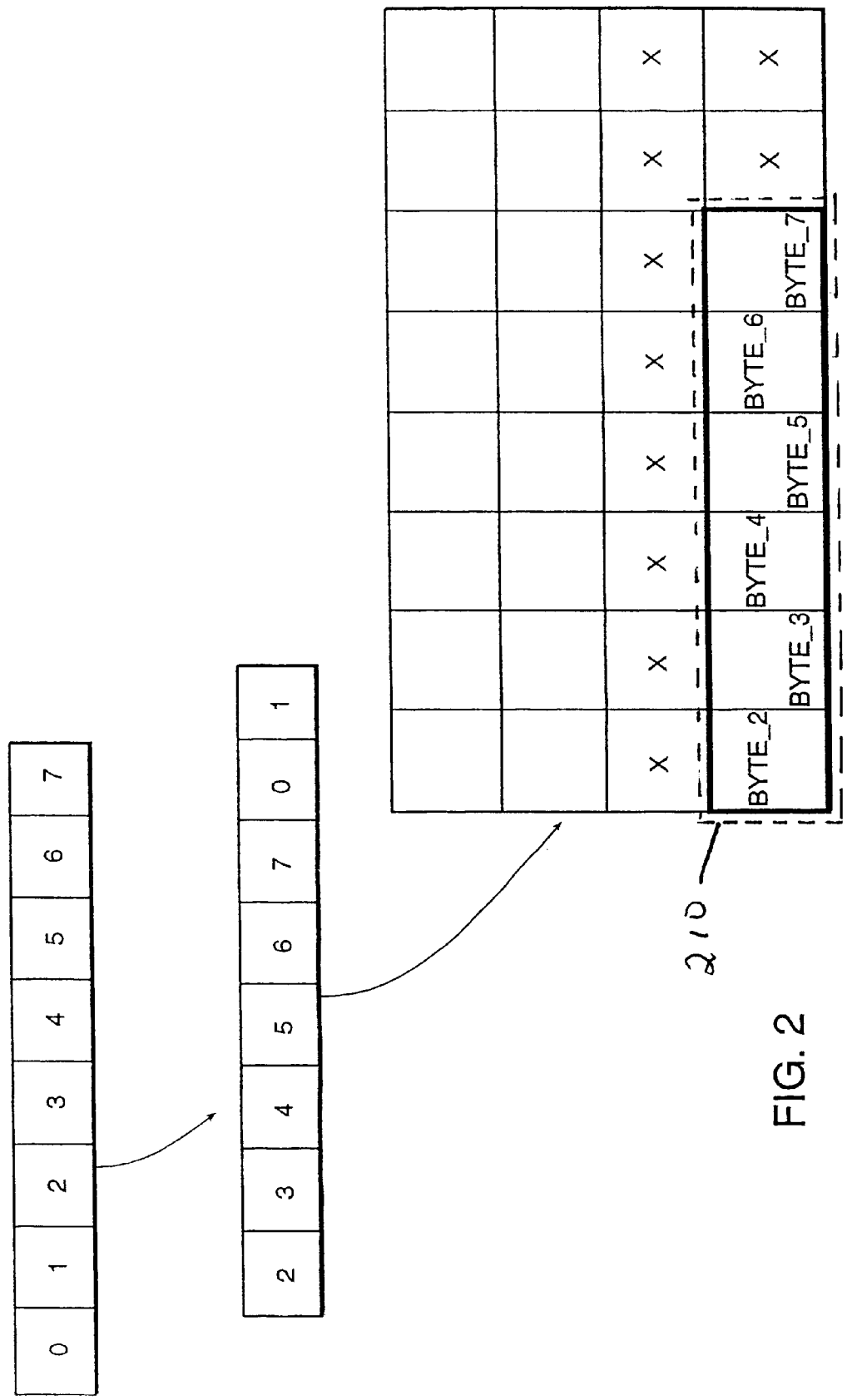
FIG. 2 is a schematic illustration of a method of an embodiment of the invention for loading a first line of data into a packet buffer.

Referring now to FIG. 2, the operation of the packet buffer controller logic unit 16 is schematically shown. A received line of data from memory includes the bytes of data as stored in memory from byte 0 sequentially through byte 7. An example is shown where the shift value received by the packet buffer controller logic unit was a 2. The wrap-around shift register shifts the received line of data 2 bytes to the left. Thus, the third byte (byte 2) is now at the beginning of the line of data to be written into the packet buffer. This is the first line of data for the packet payload being written into the packet buffer. For a shift value of 2, is only necessary to write the bytes following the first two bytes of the received line into the packet buffer. In most cases, however, it will be simpler to write the entire shifted line into the packet buffer. A mask 210 is then set up to prevent overwriting of the bytes that follow the first 2 bytes. Therefore, in FIG. 2, bytes numbered 2–7 in a shifted line of data are masked from being overwritten. The first two bytes, 0 and 1, are written into the packet buffer but are not masked so that they may be overwritten as they are not needed in the packet data payload. Masking is accomplished in a conventional manner. A mask bit is set for each byte in a register of the packet buffer. The mask bits are used as an input to flip-flops or multiplexers involved in the write operation from the packet buffer controller logic unit 16 to the packet buffer 12. A mask bit input determines whether or not a particular byte of data will or will not be written into the packet buffer. In an example implementation, each byte in the packet buffer 12 has a multiplexor supplying the byte to be written therein.

The inputs to the multiplexor are the old contents of the packet buffer and the new byte from the packet buffer controller logic unit 16. The mask bit for the byte in the packet buffer 12 is the selection input to the multiplexor. If a byte has been masked, the mask bit selects the old contents. If the byte has not been masked, the mask bit selects the new byte.

Figure 3:
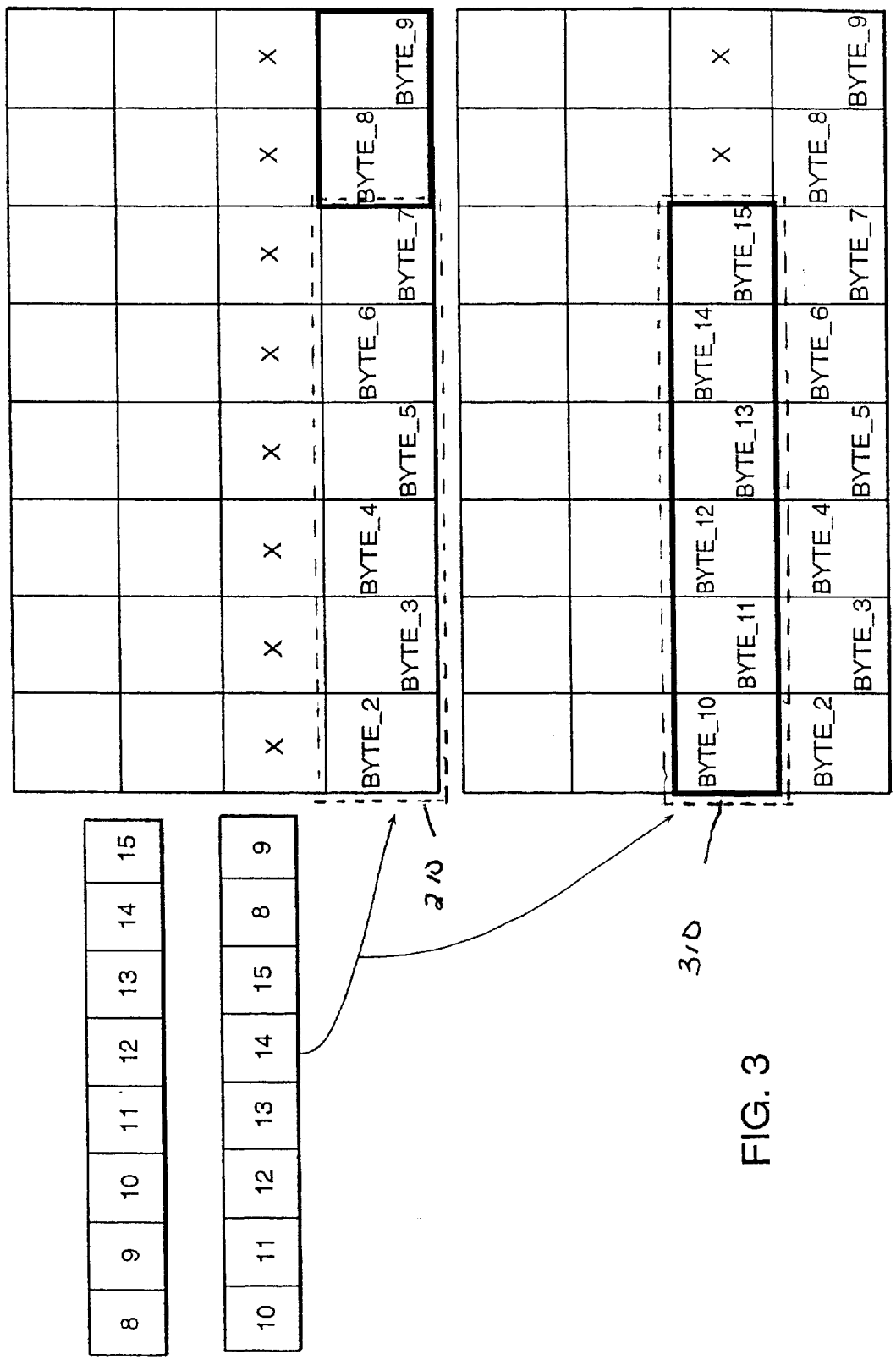
FIG. 3 is a schematic illustration of a method of an embodiment of the invention for loading a line of data into a packet buffer.

Subsequent lines of data received for input into the packet data payload may be handled in accordance with a method as illustrated in FIG. 3. A line of data in memory is received along with its tag indicating a shift value. A tag may also include a unique identifier used to put the received lines of data in the appropriate sequence for writing into the packet buffer. The shift value in the tag is used to shift the received line of data accordingly. As shown in FIG. 3, the received line of data includes bytes 8–15 to the memory. For the shift value 2, the line of data is shifted to the left two bytes so that it now begins with byte 10. Preparation of the mask 210 to protect the existing bytes in the buffer is completed. The mask 210 protects data across the width of the buffer except for the last N bytes where N equals the shift value. The shifted line of data is written into the packet buffer over the previous written line of data. Bytes 8 and 9 are in unmasked positions of the packet buffer. Thus, bytes 8 and 9 are written over the unmasked bytes into the packet buffer. Bytes 10–15 are in masked positions of the packet buffer and they make no changes to the masked positions of the packet buffer. In this manner, the desired data from the packet data payload is written in the appropriate sequence to the packet buffer. The buffer word pointer advances to the next word. The shifted line of data is written a second time into the packet buffer in the following register. In this manner, bytes 10–15 are transferred into the packet buffer. Bytes 8 and 9 are also written into the packet buffer for a second time but are not needed. A mask 310 will be set up to preserve bytes 10–15 while leaving bytes 8 and 9 unmasked.

After all of the received lines of data have been written into the packet buffer in the order prescribed by the unique identifiers, the packet data payload is complete. The packet data payload is made available from the packet buffer for subsequent transmission as a packet. By including a tag field in the memory read request and the response to that request and including a shift value in that tag field that is understandable to the memory request unit and packet buffer controller unit, lines of data are written into the packet buffer properly despite any misalignment between the starting address for the packet data and the starting address for the corresponding line of data from memory.

Of course, it should be understood that various changes and modifications to the preferred embodiments described above will be apparent to those skilled in the art. For example, the memory request logic unit and the packet buffer controller logic unit may be implemented in hardware or software and as separate components or as parts of a larger entity. The tags may appear in a header or in a separate field of the request devoted to tags. The packet buffer may be a large register, a series of registers or an area set aside in a random access memory. These and other changes can be made without departing from the spirit and scope of the invention and without diminishing its attendant advantages. It is therefore intended that such changes and modifications be covered by the following claims.

We claim:

1. A memory access system comprising:

a memory storing lines of data;

means for obtaining a shift value corresponding to any misalignment in said memory between the lines of data and data desired for a packet payload;

means for sending to said memory a read request for selected lines of data, said read request including a tag with the shift value; and means for receiving at a packet buffer controller, in response to the read request:
a selected line of data; and
the tag;

wherein the packet buffer controller is configured to shift contents of the selected line of data according to the shift value before writing the shifted contents to a packet buffer.

2. The memory access system of claim 1 wherein the shift value is taken from the least significant bits of a starting address in said memory for the desired data.

3. The memory access system of claim 1 wherein the shift value is obtained by performing subtraction.

4. The memory access system of claim 1 wherein the tag further includes a unique identifier for the read request.

5. The method of claim 1, wherein the packet buffer controller comprises means for masking the shifted contents of the line of data as the shifted contents are written into the packet buffer.

6. A packet buffer control system comprising:
a memory storing bytes of data in lines;
a packet buffer for storing bytes of data in lines;
a packet buffer controller configured to:
receive lines of data from said memory along with a tag indicating a shift value; and
shift said received lines of data for storage in said packet buffer in accordance with the shift value; and
means for masking a shifted line of data for each received line of data, in accordance with the shift value, to prevent overwriting at least a part of the received data.

7. The packet buffer control system of claim 6 wherein said packet buffer controller comprises a wrap-around shift register in which said received line of data is shifted for storage.

8. A method of communicating alignment information, the method comprising:
preparing read requests for lines of data from a memory to fill a packet payload;
obtaining a shift value corresponding to any misalignment between the lines of data in said memory and data desired for the packet payload;
sending a read request for the lines of data, said request including a tag with the shift value, said tag being configured for inclusion in a response to the read request;
receiving at a packet buffer controller the response, said response including a line of data and the tag; and
shifting the line of data in accordance with the shift value in the tag and writing the shifted line of data into the packet buffer,
wherein said act of writing writes bytes of the shifted line of data that are in unmasked positions of the packet buffer into the packet buffer while bytes of the shifted line of data in masked positions of the packet buffer do not make changes to the masked positions of the packet buffer.

9. The method of claim 9 further comprising writing the shifted line of data into the packet buffer for a second time.

10. The method of claim 9 further comprising setting up a mask for bytes in the packet buffer across the width of the buffer except for the last N bytes, where N equals the shift value.

11. The method of claim 9 wherein writing the shifted line of data into the packet buffer for a first time and second time comprises writing the shifted line of data into consecutive lines of the packet buffer.

12. The method of claim 8, wherein the tag is in a field of the response to the read request.

13. A method of loading a first line of a plurality of lines of data into a packet buffer, the method comprising:
receiving the first line of the plurality of lines of data from memory along with a tag indicating a shift value;
writing at least the bytes of data following the first N bytes of the first line of data into the packet buffer, where N equals the shift value; and
setting up a mask into the packet buffer for said bytes of data in the first line of data that followed the first N bytes.

14. The method of claim 13 wherein writing comprises shifting the line of data in accordance with the shift value in the tag and writing the shifted line of data into the packet buffer.

15. A method of loading a line of data into a packet buffer, the method comprising:
receiving the line of data from memory along with a tag indicating a shift value;
shifting the line of data in accordance with the shift value in the tag;
writing the shifted line of data into the packet buffer a first time; and
writing the shifted line of data into the packet buffer a second time;
wherein writing the shifted line of data into the packet buffer a first time and a second time comprises writing the shifted line of data into consecutive lines of the packet buffer.

16. The method of claim 15 wherein said acts of writing write bytes of the shifted line of data that are in unmasked positions of the packet buffer into the packet buffer while bytes of the shifted line of data in masked positions of the packet buffer do not make changes to the masked positions of the packet buffer.

17. The method of claim 16 further comprising setting up a mask for bytes in the packet buffer across the width of the buffer except for the last N bytes, where N equals the shift value.

18. A system for building packets, comprising:
a memory storing lines of data;
a memory request logic unit for generating a read request to memory including a tag with a shift value corresponding to any misalignment between the lines of data and data desired for the packet payload;
a packet buffer for storing bytes of data in lines; and
a packet buffer controller configured to:
receive, responsive to the read request, a line of data from said memory along with the tag indicating the shift value;
shift said received line of data in accordance with the shift value; and
mask said shifted received line of data while writing said shifted received line of data into said racket buffer.

19. The system of claim 18 further comprising means for masking said packet buffer.

20. The system of claim 18 wherein said packet buffer controller comprises a wrap-around shift register in which said received line of data is shifted for storage.

21. The system of claim 18 wherein the tag is in a field of the read request.

22. The system of claim 21 wherein the tag further includes a unique identifier for the read request.

* * * * *

UNITED STATES PATENT AND TRADEMARK OFFICE
CERTIFICATE OF CORRECTION

PATENT NO.    : 6,820,186 B2
DATED         : November 16, 2004
INVENTOR(S)   : Webber et al.

It is certified that error appears in the above-identified patent and that said Letters Patent is hereby corrected as shown below:

Column 6,
Line 55, replace "racket" with -- packet; --

Signed and Sealed this

Twenty-fifth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,820,186 B2
DATED : November 16, 2004
INVENTOR(S) : Webber et al.

It is certified that error appears in the above-identified patent and that said Letters Patent is hereby corrected as shown below:

Column 6,
Line 55, replace "packet;" with -- packet --.

Signed and Sealed this

Twenty-sixth Day of July, 2005

JON W. DUDAS
*Director of the United States Patent and Trademark Office*